Patented June 21, 1949

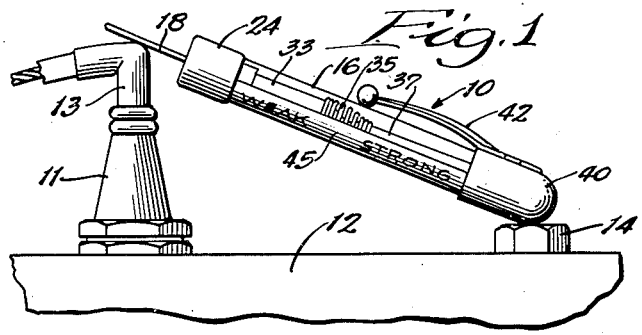
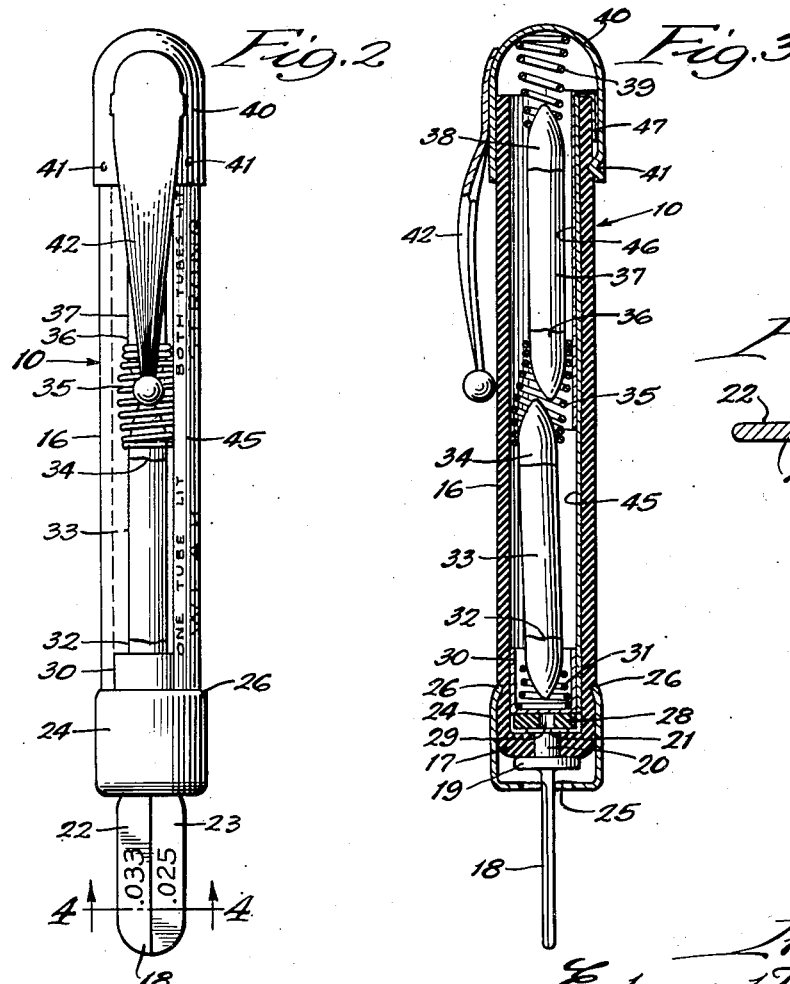
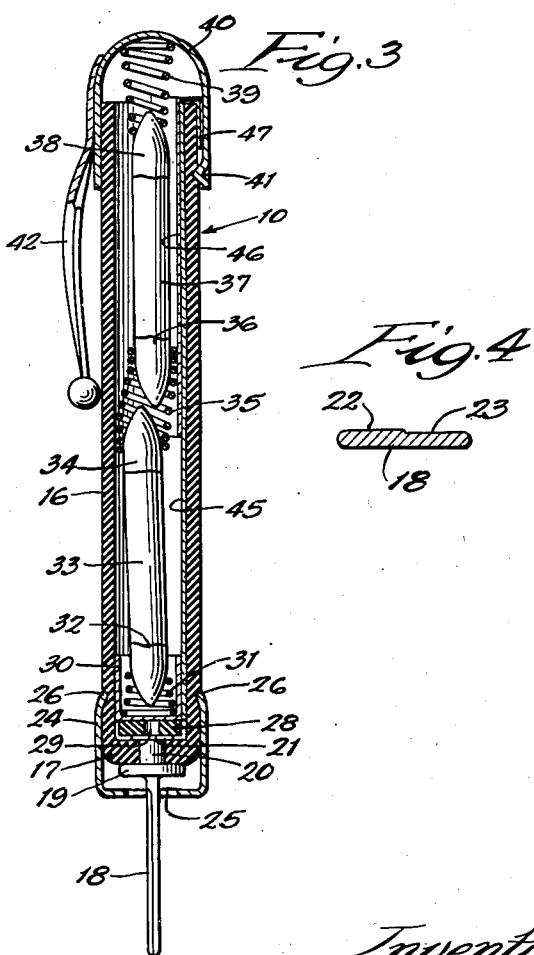
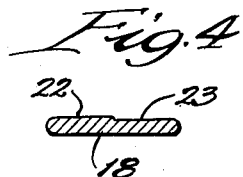

2,474,073

UNITED STATES PATENT OFFICE 2,474,073

HIGH-VOLTAGE TESTER AND INDICATOR

Edward V. Sundt, Chicago, Ill., assignor to Littelfuse, Incorporated, a corporation of Illinois Application December 13, 1946, Serial No. 716,160

4 Claims. (Cl. 175—183)

This invention relates to testers and indicators for high voltages and has particular utility in testing and setting spark plugs of internal combustion engines.

The principal object of this invention is to provide an improved tester and indicator for high voltages which may be readily and inexpensively manufactured, which is small in size and readily manipulated and carried, which provides a visual indication of different voltage values, which when used for testing spark plugs provides a visual indication of strong and weak spark and which is provided with means for properly setting the spark gap of spark plugs.

Further objects of this invention reside in the details of construction of the tester and indicator and the cooperative relation between the component parts thereof.

Other objects and advantages will become apparent to those skilled in the art upon reference to the accompanying specification, claims and drawing in which—

Figure 1 is an illustration of the tester and indicator of this invention as utilized for testing spark plugs of an internal combustion engine;

Figure 2 is an enlarged elevational view of the tester and indicator;

Figure 3 is a vertical sectional view through the tester and indicator; and

Figure 4 is a sectional view taken substantially along the line 4—4 of Fig. 2.

The tester and indicator is generally designated at 10 and may be utilized for testing spark plugs 11 of an internal combustion engine 12. When in use, the tester and indicator 10 is interposed between the high tension lead 13 to the spark plug 11 and ground as indicated at 14. Sufficient ground may be obtained by holding the tester in the hand so that it is not necessary to positively ground the same as shown. The current is so small, no shocks are felt. The tester and indicator thus utilized provides an indication of the strength of the spark of the spark plug 11.

The tester and indicator 10 includes a transparent tube 16 having a closed end 17 and preferably made of transparent plastic. A contact in the form of a test blade 18 having a shoulder 19 and a shank 20 is secured to the end of the tube 16 by inserting the shank 20 through a suitable opening therein and then riveting over the shank as at 21. In this way, the test blade is securely held in the end 17 of the transparent tube 16 and also provides an electrical path through the end of the transparent tube. The test blade is made of metal and is provided with two thicknesses 22 and 23, the thickness 22 being .033 inch and the thickness 23 being .025 inch. These particular thicknesses are preferably utilized since they represent the best setting for the spark gap of spark plugs utilized in internal combustion engines and the test blade is utilized for assisting the proper setting of the spark gap. If desired, the test blade may have other thickness dimensions.

In order to enhance the appearance of the tester and indicator, the end of the tube 16 may be enclosed in a cap 24 having an opening 25 for receiving the test blade 18, and the cap 24 may be secured to the plastic tube 16 by curling the end thereof inwardly as indicated at 26. If desired, the cap 24 may be omitted.

Mounted within the tube 16 and abutting the peened portion 21 of the test blade 18 is a washer 28 having a central opening 29. The washer 28 is made of insulating material and the opening 29 therethrough provides a calibrated air spark gap, the spark gap being determined by the thickness of the washer 28.

Also mounted in the tube 16 and resting on the washer 28 is a metallic cup 30 which receives a coil spring 31. The coil spring 31 provides an electrical connection between the cup 30 and the metallic-coated end 32 of an electrodeless rare gas tube 33. The other metallic-coated end 33 is electrically connected by a coil spring 35 to the metallic-coated end 36 of a second electrodeless rare gas tube 37. The metallic-coated end 38 of the second gas tube is electrically connected by a coil spring 39 to a metallic cap 40 mounted over the other end of the transparent tube 16 and secured in place thereon by indenting portions of the cap 40 into the plastic supporting tube 16 as indicated at 41. The cap 40 may be provided with a pocket clip 42 so that the tester and indicator may be carried in a pocket in a manner similar to a pencil or pen. Thus a series electrical connection is made from the test blade 18 through the spark gap and the first and second gas tubes to the cap 40. The cap 40 provides an electrical contact. The springs 31, 35, and 39 in addition to providing electrical connections, also provide means for holding the various elements in proper relation within the transparent plastic supporting tube 16.

Also mounted in the supporting tube 16 and conforming to the curvature thereof and extending partway around the inside of the tube is an indicator strip 45 which is provided with indications adjacent the gas tubes 33 and 37. Specifically, the indications show that if only gas tube 33 is lit, the spark of the spark plug 11 is weak, and if both tubes 33 and 37 are lit, then the spark of the spark plug 11 is strong.

Throughout a portion of the length of the indicator strip 45 there is provided an internal layer of resistance material 46 which may be formed by coating the inner surface of the strip 45 with a conductive paint. The upper end of the strip 45 is folded over the edge of the supporting tube 16 and is clamped between the outer surface of the supporting tube 16 and the cap 40. The lower end of the strip 45 is clamped between the inner surface of the supporting tube 16 and the cup 30. In this way, the strip 45 is securely held in place in the supporting tube 16. Further, the resistance material 46 on the strip 45 is in electrical contact with the cap 40. The spring 35 forming the electrical connection between the gas tubes 33 and 37 also abuts against the resistance material 46 on the strip 45 thereby establishing an electrical connection thereto. In this way, the resistance material 46 is electrically connected in shunt or parallel to the gas tube 37 and preferably the resistance value of the resistance material 46 is substantially one-half megohm.

In the use of the tester and indicator 10 for testing spark plugs, the test blade 18 is subjected to the high potential terminal 13 of the spark plug 11 and the cap 40 is subjected to ground potential either directly or through the hand and body. When the high voltage is applied to the test blade 18 and if the voltage is high enough, the current jumps the spark gap and by so doing generates an oscillating high frequency discharge which lights the gas tubes 33 and 37 in passing to ground through the cap 40. Part of the current applied to the gas tube 37 is shunted by the resistance material 46 and a high potential voltage is, therefore, required to light the gas tube 37. If, however, the voltage is lower as the result of a weak spark, sufficient current will not pass through the gas tube 37, whereby only the gas tube 33 will be lit. The indications on the indicator strip 45 indicate in connection with the gas tubes 33 and 37 whether the spark is strong or weak.

If the test does not disclose a strong spark, then the spark plugs 11 may be removed and the spark gap thereof adjusted with the aid of the test blade 18 until the proper spark gap setting is obtained. If the spark gap is set too close, a weak spark is indicated, and if the spark gap is too great, the spark plug 11 will misfire occasionally. Proper setting of the spark gap of the spark plug 11 is, therefore, assured by this arrangement. When the tester and indicator is applied to the spark plug 11, both gas tubes 33 and 37 light under normal ignition voltage which is usually over 4,000 volts peak. If the spark plug is fouled by carbon or has a cracked insulator, ignition voltage is held down to about 2,000 volts or less, in which case, only the gas tube 33 lights. If the ignition is shorted to ground by a low resistance carbon deposit or other fault, neither gas tube 33 or 37 will light.

While the tester and indicator has been disclosed particularly in conjunction with the testing and setting of spark plugs for internal combustion engines, it may also be utilized to indicate resonance in radio frequency fields and charges of static electricity.

While for purposes of illustration, one form of this invention has been disclosed, other forms thereof may become apparent to those skilled in the art upon reference to this disclosure, and, therefore, this invention is to be limited only by the scope of the appended claims and prior art.

I claim:

1. A high voltage tester and indicator comprising a transparent supporting tube of insulating material, a first contact secured to one end of the supporting tube to be subjected to the high voltage potential, a second contact secured to the other end of the supporting tube to be subjected to ground potential, a first gas tube carried in the supporting tube, means for electrically connecting the first contact to one end of the gas tube, a second gas tube carried in the supporting tube, means for electrically connecting one end of the second gas tube to the other end of the first gas tube, means for electrically connecting the other end of the second gas tube to the second contact, an indicator strip carried longitudinally in the supporting tube and provided throughout a portion of its length with electrical resistance material, said means for electrically connecting the first and second gas tubes also being electrically connected to one end of the electrical resistance material and means for electrically connecting the other end of the electrical resistance material to the second contact.

2. A high voltage tester and indicator comprising a transparent supporting tube of insulating material, a first contact secured to one end of the supporting tube to be subjected to the high voltage potential, a second contact secured to the other end of the supporting tube to be subjected to ground potential, a washer of insulating material carried in the supporting tube and engaging the first contact to form a spark gap, a metallic cap carried in the supporting tube and engaging the washer, a gas tube carried in the supporting tube, a spring for electrically connecting the cap to one end of the gas tube, and means including a spring for electrically connecting the other end of the gas tube to the second contact.

3. A high voltage tester and indicator comprising a transparent supporting tube of insulating material, a first contact secured to one end of the supporting tube to be subjected to the high voltage potential, a second contact secured to the other end of the supporting tube to be subjected to ground potential, a washer of insulating material carried in the supporting tube and engaging the first contact to form a spark gap, a metallic cap carried in the supporting tube and engaging the washer, a gas tube carried in the supporting tube, a spring for electrically connecting the cap to one end of the gas tube, a second gas tube carried in the supporting tube, a spring connecting one end of the second gas tube to the other end of the first gas tube, and a spring connecting the other end of the second gas tube to the second contact.

4. A high voltage tester and indicator comprising a transparent supporting tube of insulating material, a first contact secured to one end of the supporting tube to be subjected to the high voltage potential, a second contact secured to the other end of the supporting tube to be subjected to ground potential, a washer of insulating material carried in the supporting tube and engaging the first contact to form a spark gap, a metallic cap carried in the supporting tube and engaging the washer, a gas tube carried in the supporting tube, a spring for electrically connecting the cap to one end of the gas tube, a second gas tube carried in the supporting tube, a spring connecting one end of the second gas tube to the other end of the first gas tube, a spring connecting the other end of the second gas tube to the second contact, an indicating strip secured in the supporting tube by the metallic cup and the second contact, and resistance material on the indicating strip throughout a portion of its length to be engaged by the spring connecting the first and second tubes and by the second contact.

EDWARD V. SUNDT.

REFERENCES CITED

The following references are of record in the file of this patent:

UNITED STATES PATENTS

| Number | Name | Date |
|---|---|---|
| 1,913,155 | Ferguson | June 6, 1933 |
| 1,951,218 | Somers | Mar. 13, 1934 |
| 1,957,802 | Rabezzana | May 8, 1934 |
| 2,001,382 | Faltico | May 14, 1935 |
| 2,199,115 | Safholm | Apr. 30, 1940 |
| 2,254,080 | McCarty | Aug. 26, 1941 |
| 2,256,086 | Guziel | Sept. 16, 1941 |
| 2,450,153 | Moore | Sept. 28, 1948 |